United States Patent [19]

Gorzynski et al.

[11] Patent Number: 5,516,885
[45] Date of Patent: May 14, 1996

[54] EPIHALOHYDRIN-BASED RESINS HAVING A REDUCED HALOGEN CONTENT

[75] Inventors: Marek Gorzynski; Andreas Pingel, both of Düren, Germany

[73] Assignee: Akzo Nobel N.V., Arnhem, Netherlands

[21] Appl. No.: 167,879

[22] PCT Filed: May 19, 1992

[86] PCT No.: PCT/EP92/01134

§ 371 Date: Dec. 15, 1993

§ 102(e) Date: Dec. 15, 1993

[87] PCT Pub. No.: WO92/22601

PCT Pub. Date: Dec. 23, 1992

[30] Foreign Application Priority Data

Jun. 19, 1991 [EP] European Pat. Off. ............ 91201553

[51] Int. Cl.⁶ .................... B01J 39/04; C08G 59/00; C08F 6/06; C08F 6/10
[52] U.S. Cl. ............................................. 528/482; 528/405
[58] Field of Search ........................... 528/482, 405

[56] References Cited

U.S. PATENT DOCUMENTS

| | | | |
|---|---|---|---|
| 2,926,154 | 2/1960 | Keim | 260/29.2 |
| 3,194,427 | 7/1965 | Mullet et al. | 220/25 |
| 3,311,594 | 3/1967 | Earle | 260/77.5 |
| 4,857,586 | 8/1989 | Bachem et al. | 524/845 |
| 4,975,499 | 12/1990 | Bachem et al. | 525/430 |
| 4,994,627 | 2/1991 | Cuscurida et al. | 568/621 |
| 5,017,642 | 5/1991 | Hasegawa et al. | 524/608 |
| 5,019,606 | 5/1991 | Marten et al. | 523/414 |
| 5,173,548 | 12/1992 | Yokoyama | 528/482 |

FOREIGN PATENT DOCUMENTS

| | | |
|---|---|---|
| 0355158B1 | 2/1989 | European Pat. Off. . |
| 0510987A1 | 10/1992 | European Pat. Off. ........ C08G 69/48 |
| 512423 | 11/1992 | European Pat. Off. ........ C08G 59/10 |

OTHER PUBLICATIONS

Devore, et al., Proceedings from 1991 Papermakers Conference, Apr. 8–10, 1991, pp. 377–390.
Ullmann, *Encyclopedia der Technischen Chemie*, Ionenaustauscher, vol. 8, pp. 787–817.
International Search Report mailed Sep. 14, 1992.

*Primary Examiner*—Thurman K. Page
*Assistant Examiner*—Peter F. Kulkosky
*Attorney, Agent, or Firm*—Ralph J. Mancini; Louis A. Morris

[57] ABSTRACT

The disclosed invention pertains to a process for the preparation of a water-soluble, nitrogen-containing, epihalohydrin-based resin having a reduced content of total halogen, organic halogen, adsorbable organic halogen (AOX) and by-products. The process involves treatment of nitrogen-containing, epihalohydrin-based resins or intermediate reaction-products with a basic ion-exchanger. The invention also pertains to novel resins displaying such halogen contents far below the values known in the art. Subject resins are useful as wet-strength agents for paper and are preferably of the polyaminoamide-epihalohydrin type.

12 Claims, No Drawings

EPIHALOHYDRIN-BASED RESINS HAVING A REDUCED HALOGEN CONTENT

The invention pertains to a process for the preparation of a water-soluble, nitrogen-containing, epihalohydrin-based resin comprising the step of subjecting the resin to an organic halogen reducing after-treatment.

Resins of the above type, mainly polyaminoamide-epihalohydrin resins, are well-known and find wide usage as wet-strength agents for paper. Epihalohydrin is known to impart wet-strength efficacy to polyaminoamides, but also causes the eventual resins to contain large amounts of organic halogen. A significant number of efforts to overcome this problem while retaining the product's wet-strength imparting effect has been reported.

Thus, a process of the type mentioned in the opening paragraph, which can be based on conventional previous reaction steps, e.g. comprising the reaction of polyaminoamide and epihalohydrin, is known from published European Patent Application No. 0 349 935. Said step consists of contacting the prepared resin with a base to convert it into a product having a pH >8, after which neutralization can take place. In this manner the organic chlorine content can be reduced to as little as 1% by weight. However, it is disclosed that, irrespective of the extent of the reduction of the organic chlorine content, the total chlorine content will remain unchanged. This is a serious limitation of the effect of the after-treatment, the remaining inorganic chlorine being a potential source of newly formed organic chlorine since it is the aqueous resin solution in which a new equilibrium will be established.

The invention has for one of its objects to obviate this drawback by providing a method for reducing the total chlorine content. Also, the invention meets the objective of further reducing the content of organic halogen without the resin's favourable properties being adversely affected.

In order to meet these and other objectives, the invention consists in that in a process of the above-described known type the after-treatment comprises contacting the resin with a basic ion-exchanger.

Unexpectedly, the after-treatment according to the present invention results in the resin subjected to it having a surprisingly low total halogen content of 1% by weight or lower, calculated on solid resin. It should be noted that in EP 389 935 the total halogen content remains at a level of 13,52% by weight, calculated on solid resin. So, clearly, the process according to the invention results in an unobvious improvement, further evidenced by the fact that the total halogen content in the novel resins prepared in accordance with the invention is even lower than the organic halogen content of the known resins.

Evidently, the total halogen content of the resins prepared in accordance with the present invention being considerably lower than in known resins, the resulting organic halogen content is lower also, viz. below 0.1% by weight, calculated on solid resin. In this respect it should be noted that .the following art-recognized definitions of halogen contents apply to the description of subject invention:

Total halogen content obviously indicates all halogen present and this is the sum of all organic and inorganic halogen present, Organic halogen content indicates all halogen linked to organic molecules, i.e. total halogen minus inorganic halide ions.

Adsorbable organic halogen, hereinafter referred to as AOX, is a term widely used in the art of wet-strength agents for paper. It indicates all organic halogen that can be determined by means of adsorption onto activated carbon using the method according to DIN 38409, part 14.

By-products content refers to 1,3-dihalo-2-propanol (DXP) and 1-halo-2,3-propane diol (MXP), which are the most important undesired by-products formed when a resin is prepared from a reaction mixture containing epihalohydrin. Since the most common epihalohydrin in the art is epichlorohydrin, by-products content frequently indicates DCP (dichloro propanol) and MCP (mono chloro propane diol).

A different approach towards low halogen contents is followed in EP 335 158, which discloses substitution of epihalohydrin by halogen-free crosslinkers. The crosslinker being allowed to contain a maximum of 15 mole % epihalohydrin, the resin is not an epihalohydrin-based resin in accordance with the present invention. Particularly low halogen values are disclosed if no epihalohydrin is present at all.

Several other processes for the preparation of water-soluble, nitrogen-containing, epihalohydrin-based resins with reduced halogen contents have been reported, but the halogen contents of the resins prepared by the disclosed processes by no means approximate the low level of the novel resins prepared in accordance with the present invention.

EP 282.862, which discloses a process of the type mentioned in the opening paragraph in which the after-treatment consists of reacting the epihalohydrin-based reaction products with a base followed by conversion with halogen-free acids, presents an organic halogen content of 2,73% by weight, calculated on solid resin. EP 332 967, which discloses a process similar to the EP 282 862 process but in which essentially a mixture of polyamines is applied, presents an organic halogen content of 0,74%, calculated on solid resin. Another disclosure, EP 374 938, only demonstrates a reduced by-product content when referring to organic halogen. The products prepared in accordance with the present invention not only display unexpectedly low total and organic halogen contents, but also unexpectedly low AOX and by-products contents.

It is noted that basic ion-exchangers are known to remove inorganic halide ions. It should be stressed that this does not at all suggest their aiding in the removal of organic halogen, let alone the present finding which provides a significant reduction of total halogen, organic halogen, AOX, and by-products contents and thus presents a solution to a serious problem in the art. The nature of the frequently complicated processes disclosed, which typically includes the alteration of several process parameters, does not at all suggest that a relatively simple after-treatment as applied in accordance with the present invention would have such an impact on the total halogen content, let alone the organic halogen, AOX, and by-products contents. The after-treatment, which in itself can be carried out in a simple manner, generally results in novel products having a total halogen content of below 1% by weight, an organic halogen content of below 0,1% by weight, an AOX content of below 0,002% by weight and by-product contents of below 0,025% by weight of DXP and 0,005% by weight of MXP, calculated on solid resin.

In order to perform the process of the present invention it is a requirement to use a basic, preferably strongly basic ion-exchanger. Ion-exchangers are known in the art and can generally be described as solid substances which upon contact with an electrolyte solution are capable of taking up ions (either positive or negative) and exchange these for an equivalent amount of different ions bearing the same sign. Though the invention process is not limited with respect to the specific type of ion-exchanger used, the most important class of materials is formed by ion-exchanger resins, more specifically synthetic resins. Ion-exchangers of this kind generally comprise a high polymer network of hydrocarbon chains that acts as a matrix for charge-carrying groups linked to it. Basic ion-exchangers generally carry caticnic groups such as $—NH_3^+$, $=NH_2^+$, $\equiv N^+$, $—S^+$, Ion-exchanger resins can be regarded as polyelectrolytes that, due to their crosslinked matrix structure, swell in water rather than dissolve. Since ion-exchangers belong to the common knowledge of the skilled artisan, a detailed explanation need not be given here. Reference is made to Ullmann, *Encyclopädie der Technischen Chemie*, which has a chapter on ion-exchangers (in the 1957 edition this is Volume 8, pages 787 ff.). Good examples of basic ion-exchangers that can be used in the process of the present invention include these listed in the table given by Ullmann (above edition, page 817). Other basic ion-exchangers, e.g. those based on a polystyrene or polyacrylic matrix, are equally suitable, and admixed resins can also be applied.

Preferably, the ion-exchangers used in the process of the present invention contain tertiary amine and/or quaternary ammonium groups. Strongly basic ion-exchangers are greatly preferred over weakly basic ion-exchangers. Good examples of such ion-exchangers include resins carrying quaternary ammonium groups having three lower alkyl substituents or quaternary ammonium groups containing at least one lower alcohol substituent. Mixed resins can also be applied. The highest preference is given to ion-exchanger resins of a type carrying quaternary ammonium substituents selected from the group consisting of trimethyl ammonium, dimethylethanol ammonium, and mixtures thereof. Applying these most preferred strongly basic ion-exchangers results in epihalohydrin-based resins having a total halogen content of below 0,5% by weight and an organic chlorine content of below 0,05%, calculated on solid resin. It has been possible to reduce the AOX content to even below 0,005% by weight and to reduce the by-products content to below 0,005% by weight of DXP and 0,003% by weight of MXP.

A detailed, unlimitative description of the after-treatment in accordance with the present invention typically is as follows:

the ion-exchanger resin to be used is transferred from the chloride form (as it is frequently available) to the hydroxy form (regeneration) and washed mixing with regenerant is continued until regeneration is completed a solution of epihalohydrin-based resin (up to 20% solids content) is passed through the exchanger resin bed, after which the exchanger resin is washed.

A typical dwell time for the epihalohydrin resin to be in contact with the ion-exchanger bed generally is of the order of about 2 hours, but dwell times of less than 1 hour are preferred.

The after-treatment in accordance with the present invention can basically be preceded by any known process for the preparation of epihalohydrin-based resins. Such processes include those disclosed in the above-referenced European Patent Applications, which are all incorporated by reference for all purposes. Further disclosures of processes for the preparation of water-soluble, nitrogen-containing, epihalohydrin-based resins are found in EP 74 558, U.S. Pat. No. 3,311,594, U.S. Pat. No. 4,336,835, U.S. Pat. No. 3,891,589, and U.S. Pat. No. 2,926,154, which are all incorporated by reference for all purposes. The process according to the present invention may also comprise subjecting commercially or otherwise readily available epihalohydrin-based resins to the after-treatment described hereinbefore. A more detailed description of typical examples of epihalohydrin-based resins will follow below, after a discussion of the novel products to which the invention also pertains.

The invention pertains also to novel, water-soluble, nitrogen-containing, epihalohydrin-based resins obtainable by the above described process. The novel resins fulfill the requirement of having reduced AOX and by-products contents and are characterized by having a total halogen content of below 1% by weight, calculated on solid resin. As is also clear from the above, these novel resins constitute a surprising and unexpected finding, since in view of EP 349 935 the artisan would not expect an epihalohydrin-based resin with a total halogen content even lower than the disclosed organic halogen content to be obtainable. In a preferred embodiment, the invention pertains to resins obtainable by a process involving the after-treatment described hereinbefore which display a total halogen content of below 0,5% by weight, calculated, on solid resin.

The total halogen content for the invention resins being considerably lower than in known resins, the organic halogen content is lower also. In this respect the invention also pertains to novel resins having the unobviously low content of below 0,1% by weight of organic chlorine, calculated on solid resin. Even further preferred invention resins are obtainable, viz. those displaying an organic halogen content of below 0,05% by weight, calculated on solid resin. As is clear from the earlier-discussed disclosures of epihalohydrin-based resins with reduced halogen contents, the invention resins cannot be derived from the art in view of their low contents of total chlorine, organic chlorine, AOX and by-products. In this respect the invention also pertains to epihalohydrin-based resins displaying an AOX content of below 0,01% by weight and by-product contents of below 0,005% by weight of DXP and 0,003% by weight of MXP, calculated on solid resin. Preferred resins are obtainable in which the AOX content is below 0,005% by weight, calculated on solid resin.

Subject water-soluble, nitrogen-containing, epihalohydrin-based resins which are characterized by their novel low halogen contents and are obtainable by the novel process described hereinbefore, can basically be of any type known in the art of paper wet-strength agents. In addition to the above-referenced and incorporated disclosures, preferred resins can be as follows.

Subject resins, also referred to as cationic thermosetting resins, generally comprise a nitrogen-containing precursor and a halogen-containing crosslinker. The resins according to the invention preferably are of the type commonly referred to as polyaminoamide-epihalohydrin resins. Epihalohydrins used in preparing such resins include, particularly, epibromohydrin and—preferably—epichlorohydrin. A typically preferred mole ratio is 1,3-0,7 moles of epihalohydrin per mole of basic nitrogen in the polyaminoamide. The epihalohydrin is generally comprised in the crosslinker. In preferred epihalohydrin-based resins at least a substantial part of the crosslinker is epihalohydrin, while more preferably epihalohydrin is a major part thereof, particularly about 50 to 100 mole %. It is highly preferred that the crosslinker consist of more than 80 mole % epihalohydrin.

The basic ingredient for the preferred resins is the polyaminoamide reaction product of a polycarboxylic, usually dicarboxylic acid and a polyamine. Suitable polycarboxylic acids include aliphatic, saturated or unsaturated, or aromatic dicarboxylic acids. Preferably, the polycarboxylic acids contain less than 10 carbon atoms. For the purpose of the invention, the term "carboxylic acid" is meant to include carboxylic derivatives also, such as anhydrides, esters or half esters.

Suitable polycarboxylic acids and derivatives include oxalic acid, malonic acid, succinic acid, glutaric acid, adipic acid, azelaic acid, and sebacic acid. Mixtures of these acids can also be applied. The preferred polycarboxylic acid is adipic acid.

Suitable polyamines include polyalkylene polyamines, or mixtures thereof, satisfying the following formula:

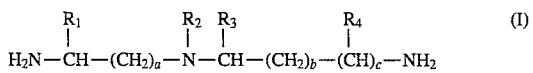

in which $R_1$–$R_4$ represent hydrogen or lower alkyl, preferably up to $C_3$ and a–c represent integers from 0–4. Preferred polyalkylene polyamines include diethylene triamine, triethylene tetra amine, tetraethylene penta amine, dipropylene triamine, and mixtures of these amines.

The polyamines of formula I can very well be combined with other polyamines or mixtures of other amines. Preferably, these amines satisfy the following formulae II–VII.

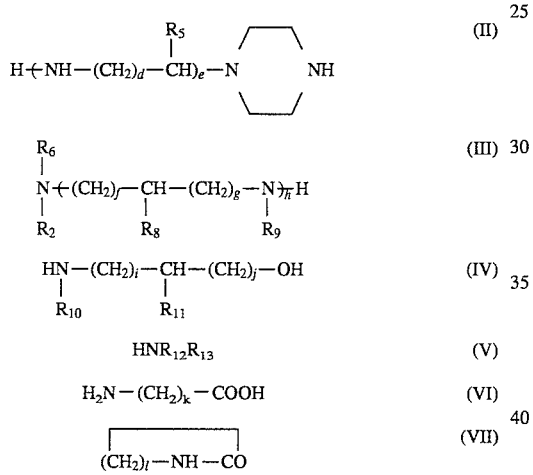

in which $R_5$–$R_{13}$ represent hydrogen or lower alkyl, preferably up to $C_3$, d–k represent integers from 0 to 4, and l represents an integer from 1 to 5.

The polycarboxylic acid and the polyamine typically are applied in a mole ratio of from 1:0,7 to 1:1,5.

A water-soluble, nitrogen-containing, epihalohydrin-based resin is generally prepared from a polyaminoamide solution. The solution preferably is aqueous and can be formed of pure water or of water in admixture with a water-miscible solvent, such as ethanol or dimethyl formamide. Many different ways of performing the reaction of epihalohydrin with polyaminoamide have been described, among others in the disclosures previously incorporated hereinto. So, reaction temperatures can be either low or high and various temperature profiles can be applied. Also, reactant concentrations may vary within a broad range. Preferably, the reaction is carried out in such a way that the end-product viscosity at 20° C. for a 10% solids content solution is in the range of 10–20 mPa.s, more preferably about 15 mPa.s. If 30% solids content solutions are prepared, the viscosity at 20° C. preferably is in the range of 150–250 mPa.s, more preferably about 200 mPa.s. The resulting molecular weights may be as low as 2000, but preferably are in the range of from 100 000–1 000 000 or higher.

The resins according to the present invention are preferably obtained by first subjecting the epihalohydrin-based, nitrogen-containing resins to the ion-exchanger treatment described hereinbefore, and then neutralizing with acid to obtain a product having a pH of, preferably, lower than 5. More preferably, the pH is adjusted to a value between about 3 and about 4.5. Resins having such preferred pH values display a better stability upon storage. It is also possible to first neutralize and then conduct the after-treatment according to the present invention. Neutralization may take place in any manner known in the art, applying any feasible inorganic or organic acids. Preferred organic acids include formic acid and citric acid, whereas preferred inorganic acids include sulfuric acid and phosphorous acid. Mixtures of acids can be applied as well.

As indicated above, the resins according to the present invention can also be obtained by subjecting commercially available water-soluble, nitrogen-containing, epihalohydrin-based resins to the ion-exchanger treatment, by virtue of which novel resins are obtained which have a halogen content reduced by 95% or more.

It should be noted that, though the ion-exchanger treatment is referred to as an after-treatment, it can also be applied during preparation of the water-soluble, nitrogen-containing, epihalohydrin-based resin. In this respect a preferred embodiment of the present invention resides in a resin obtained by a two-stage process. Such a process is basically known from previously incorporated U.S. Pat. No. 3,891,589. The ion-exchanger treatment can be applied after either the first or the second stage. A further preferred process can be described as a three-stage reaction in the following manner:

(a) reacting a polyalkylene polyamine of type I described hereinbefore, optionally in admixture with a polyamine of type II–VII described hereinbefore, with a dicarboxylic acid, preferably an aliphatic dicarboxylic acid, to form a polyaminoamide (PAIM);

(b) reacting the PAIM formed under (a) with an epihalohydrin (EHH) at a temperature of below about 40° C. to form a PAIM/EHH adduct;

(c) subjecting the adduct formed under (b) to a temperature in the range of from 50° to 70° C. to effect ring-closure and to obtain a precursor resin at a low degree of crosslinking;

(d) subjecting the precursor resin formed under (c) to treatment with a basic ion-exchanger to obtain a substantially halogen-free intermediate;

(e) keeping the intermediate obtained under (d) at alkaline pH and subjecting it to a temperature below 40° C. in order to form a water-soluble, nitrogen-containing, epihalohydrin-based resin;

(f) adjusting the pH to neutral or slightly acidic.

The temperature requirements given above should not be interpreted in a too strict sense. The quintessence of the three-stage process is that full crosslinking does not occur until after the removal of halogen. By virtue of the alkaline pH after the ion-exchanger treatment the intermediate obtained under (d) will be subject to crosslinking at relatively low temperatures. Of course, one can also lower the pH and consequently carry out crosslinking at a higher temperature. The resins thus prepared display the lowest levels of total halogen, organic halogen, AOX, and by-products. It is not excluded that halogen-containing by-products can be removed entirely, but this cannot be definitely concluded on the basis of the current detection methods.

The novel resins according to the present invention are useful as wet-strength agents for paper. As such, they have the advantage of avoiding the halogen and halogen-containing by-products contamination normally associated with using epihalohydrin-based resins in paper mills, while retaining their good wet-strength imparting properties. Hence the invention also pertains to the use of the resins described hereinbefore as wet-strength agents for paper.

The invention will be further illustrated hereinafter with reference to the Examples. The following Examples should be construed to be explanatory rather than limitative.

EXAMPLE 1

A 20% solids content aqueous solution of commercially available nitrogen-containing, epichlorohydrin-based resin EtadurinNXH (ex Akzo Chemicals) was treated with basic ion-exchanger DowexSAR (ex Dow Chemical. Co.) by elution ever a column, and then adjusted to a pH of 3,4 with formic acid. The data measured on the old and the novel product is outlined in Table I below,

TABLE I

| | Wt % (chlorine data calculated on solid resin) | | | |
| --- | --- | --- | --- | --- |
| | DCP | MCP | AOX | Total Chlorine |
| old | 1.5% | 0.5% | 2.5% | 11.7% |
| novel | <0.025% | <0.005% | <0.01% | <1% |
| reduction by | 98% | 99% | 99% | >90% |

EXAMPLE 2

Analogously to Example 1 aqueous 15% solutions of commercially available, nitrogen-containing, epihalohydrin-based resins were treated with basic ion-exchanger. The resins treated were Nadvin®LTN-A (ex Bayer). Giluton®1100/28 and Kymene®SLX. The results were as favourable as in Example 1 and are listed in Table II.

TABLE II

| | Wt % (chlorine data calculated on product as such, the solids content being indicated below) | | | | |
| --- | --- | --- | --- | --- | --- |
| Product | Solids % | DCP | MCP | AOX | Total Chlorine |
| Kymene | 12.8% | <0.1% | <0.1% | not det. | not det. |
| treated | 11.8% | 13 ppm | 104 ppm | 6.2 mg/l | 0.033% |
| Nadavin | 22.4% | 0.34% | 0.2% | 6.2 g/l | 2.9% |
| treated | 10.7% | 24 ppm | 66 ppm | 110 mg/l | 0.19% |
| Giluton | 13.7% | <0.1% | <0.1% | 0.71 g/l | 1.61% |
| treated | 10.9% | 29 ppm | 186 ppm | 39 mg/l | 0.1% |

EXAMPLE 3

A polyaminoamide-epichlorohydrin-based resin was prepared by a two-stage process in accordance with U.S. Pat. No. 3,891,589, employing dimethylene triamine in admixture with N-aminoethyl piperazine as the polyalkylene polyamine starting compound and employing epichlorohydrin as the epihalohydrin starting compound. After the first reaction stage, conducted at a temperature of about 20° C. to about 40° C., followed by about 1 to 2 hours at 60°–70° C., the precursor resin thus obtained was cooled to room temperature and subjected to treatment with the basic ion-exchanger of Example 1. The substantially halogen-free intermediate, after coming off the ion-exchanger, was subjected to a temperature of about 20° to about 30° C. while alkaline pH was maintained until crosslinking was complete. Thereafter, the pH of the reaction product was adjusted to 3,6, using formic acid.

The following data was determined, calculated on solid resin:

DCP 0,003% by weight
MCP<0,003% by weight
AOX<0,003% by weight
Total Cl about 0,18% by weight

EXAMPLE 4

Analogously to Example 1 approx 20% solution of commercially available, nitrogen-containing epihalohydrin-based resin Etadurin H® was treated with resin ion-exchanger. Analytical results are quoted in Table III.

TABLE III

| | DCP | MCP | AOX | Total Chlorine |
| --- | --- | --- | --- | --- |
| Etadurin H (19.5%) | 630 ppm | 330 ppm | 2.2 g/l | 2.5% |
| Ion exchanger treated Etadurin (13.3%) | 12 ppm | 23 ppm | 2.4 mg/l | 0.056 g/l |
| Reduction by | 98% | 91% | >99.5% | 98% |

EXAMPLE 5

A polyaminoamide-epichlorohydrin-based resin was prepared by a two-stage process in accordance with U.S. Pat. No. 3,194,427, employing diethylenetriamine as polyalkylenepolyamine, adipic acid as dicarboxylic acid, and epichlorohydrin as the epihalohydrin starting compound. After the first stage (molar ratio diethylenetriamine:adipic acid=1:1), which was performed in analogy to Example 1, the polyamide solution was treated with epichlorohydrin in analogy to Example 2 (molar ratio PAIM/ECH 1:1.20). Before HCl addition and pH adjusting the product which was cooled down to a temperature below 20° C. was subject to treatment with the basic ion-exchanger of Example 1. The substantially halogen-free intermediate, after coming off the ion exchanger, was subject to treatment at a temperature of about 20° C. to about 30° C., while alkaline pH was maintained until cross-linking was complete. Thereafter the pH of the reaction product was adjusted to 3,6 using formic/sulfuric acid/1:3.

The following data was determined and calculated on solid resin.

DCP 0.003% by weight
MCP <0.003% by weight
AOX <0.01% by weight
Total Cl about 0.18% by weight

EXAMPLE 6

A few market products, such as Etadurin H® Akzo, Kymene SLX® Hercules, Giluton 1100/28 N® Giulini and Nadavin LT-A® Bayer, were treated with ionic exchanger as in Example 1.

The following procedure was employed in order to demonstrate that the treatment of commercially available wet-strength agents with ion exchangers does not have a significant influence on the wet-strength efficacy of these products.

Test sheets of approximately 70 g/cm² were prepared on a pilot paper machine (speed 2 m/rain, capacity 2 kg/h). Furnish consisted of a 30/35/35 blend of bleached pine sulfate/birch sulfate/beech sulfite which had been beaten to a Schopper-Riegler freehess of 26° SR. The fillers DX40 (Omya) and ciay (Koalin B) each in 5 wt % were added to the stock at a temperature of 25° C. The wet-strength agents were fed into the paper machine after the stock dilution. The stock consistency at the headbox amounted to 0.34 and pH remained in the range of 7.2–7.8 for all products and concentrations, and was not adjusted. The temperatures of the cylinders in the drying section were adjusted to 60°/80°/90°/110° C.

The paper was cured for 30 min at 100° C. and then conditioned at 23° C. and relative humidity of 50% (55%) for 2 h before testing. Paper strips were soaked for 5 rain at 23° C. in distilled water before breaking length determination on an ALWETRON TH1® Gocket & Co. GmbH Munich, hydrodynamic tester.

The results of the tests are tabulated in Table IV. Tha wet-strength efficacy of the ion-exchanger treated resins is expressed as a relative wet-strength efficacy in % of the breaking length of the original resins, i.e. resins not treated with ionic exchanger.

TABLE IV $$\text{Breaking length efficiency} = \frac{\text{breaking-length of treated resin}}{\text{breaking length untreated resin}} \cdot 100\%$$

| Dosage [%] based on dry content | Etadurin H | Kymene SLX | Giluton 1100/28 | sample example 4 |
|---|---|---|---|---|
| 0,3 | 93 | 92 | 86 | 98 |
| 0,6 | 94 | 94 | 90 | 100 |
| 0,9 | 95 | 90 | 88 | 102 |

We claim:

1. The process for the preparation of a water-soluble, nitrogen-containing, epihalohydrin-based resin comprising the step of subjecting the resin to an organic halogen reducing after-treatment, wherein the after-treatment comprises contacting the resin with a polymeric basic ion-exchanger.

2. The process according to claim 1, characterized in that the basic ion-exchanger is a synthetic resin containing strongly basic substituents selected from the group consisting of tertiary amino groups, quaternary ammonium groups, and mixtures thereof.

3. A process according to claim 2, characterized in that the strongly basic substituents are selected from the group consisting of trimethyl ammonium, dimethyl ethanol ammonium, and mixtures thereof.

4. A process for the preparation of a water-soluble, nitrogen-containing, epihalohydrin-based resin comprising a first stage in which a polyaminoamide is reacted with an epihalohydrin to form an intermediate which has not reached a stage of complete crosslinking and a second stage in which complete crosslinking occurs, wherein after the first stage the intermediate is contacted with a polymeric basic ion-exchanger.

5. The process of claim 4, wherein the basic ion exchanger is a synthetic resin containing strongly basic substituents selected from the group consisting of tertiary amino groups, quaternary ammonium groups, and mixtures thereof.

6. The process of claim 5, wherein the strongly basic substituents are selected from the group consisting of trimethyl ammonium, dimethyl ethanol ammonium, and mixtures thereof.

7. The process of claim 1 wherein said ion-exchanger is in hydroxy form.

8. The process of claim 2 wherein said ion-exchanger is in hydroxy form.

9. The process of claim 1 wherein the nitrogen-containing epihalohydrin based resin is a polyaminoamide epichlorohydrin-based resin, 10. The process of claim 4 wherein said ion-exchanger is in hydroxy form.

11. The process of claim 5 wherein said ion-exchanger is in hydroxy form.

12. The process of claim 4 wherein said epihalohydrin is epichlorohydrin.

* * * * *